US006975713B1

(12) United States Patent
Smith et al.

(10) Patent No.: US 6,975,713 B1
(45) Date of Patent: Dec. 13, 2005

(54) PROVIDING MULTIPLE LINE FUNCTIONALITY USING ALTERNATIVE NETWORK TELEPHONY

(75) Inventors: Geoff Smith, Palo Alto, CA (US); Michael Lee, Cupertino, CA (US); Steve Young, Los Gatos, CA (US); Todd Krein, San Jose, CA (US)

(73) Assignees: Vulcan Research LLC, Palo Alto, CA (US); Digeo, Inc., Kirkland, WA (US)

( * ) Notice: Subject to any disclaimer, the term of this patent is extended or adjusted under 35 U.S.C. 154(b) by 171 days.

(21) Appl. No.: 10/388,605

(22) Filed: Mar. 13, 2003

(51) Int. Cl.[7] .......... H04M 1/00

(52) U.S. Cl. .......... 379/156; 379/165; 379/167.13; 379/171

(58) Field of Search .......... 379/156–160, 379/165, 177, 182, 197, 372, 373.01, 381, 379/387.01, 387.02, 93.01, 93.05–93.09, 379/399.01, 167.13, 171

(56) References Cited

U.S. PATENT DOCUMENTS

| | | | | | |
|---|---|---|---|---|---|
| 5,448,635 | A | * | 9/1995 | Biehl et al. | 379/399.02 |
| 5,623,537 | A | * | 4/1997 | Ensor et al. | 379/88.2 |
| 5,809,111 | A | * | 9/1998 | Matthews | 379/31 |
| 5,905,786 | A | * | 5/1999 | Hoopes | 379/142.12 |
| 5,960,066 | A | * | 9/1999 | Hartmann et al. | 379/93.08 |
| 6,310,940 | B1 | * | 10/2001 | Ratz | 379/88.01 |

OTHER PUBLICATIONS

Anon, 2Wire, Inc., various pages from website http://www.2wire.com/home/adap_fil.html.

Frank, Edward H. and Holloway, Jack, "Connecting the Home with a Phone Line Network Chip Set", IEEE Micro, Mar.-Apr. 2000.

Kistner, Toni, "An energized HomePNA touts telephony", Network World Fusion, http://www.nwfusion.com/cgi-bin/mailto/x.cgi.

Teliann Telimax 200 Data Sheet "last modified" Jun. 25, 2002.

Teliann Telimax 200 Data Sheet "last modified" Nov. 2, 2002.

* cited by examiner

*Primary Examiner*—Binh K. Tieu
(74) *Attorney, Agent, or Firm*—Van Pelt, Yi & James LLP

(57) ABSTRACT

Providing multiple line functionality using alternative network telephony is disclosed. A local telephone installation comprises a first and second telephone equipment (associated with a first and second local node, respectively), and local telephone wiring connected to the first and second local nodes. The local telephone installation is associated for purposes of the public switched telephone network (PSTN) with a single telephone line. A request from a calling party to establish a connection with the local telephone installation is received at a third local node. It is determined whether the calling party desires to establish a connection to (1) a first telephone extension or (2) a second telephone extension associated with the first or the second local node, respectively. A connection is established from the third local node to the desired extension over the local telephone wiring in a manner that does not affect the other extension.

40 Claims, 6 Drawing Sheets

PROVIDING MULTIPLE LINE FUNCTIONALITY USING ALTERNATIVE NETWORK TELEPHONY

CROSS REFERENCE TO RELATED APPLICATIONS

This application is related to co-pending U.S. patent application Ser. No. 10/389,277 entitled FAILSAFE CONFIGURATION FOR ALTERNATIVE NETWORK TELEPHONY filed concurrently herewith, which is incorporated herein by reference for all purposes; and co-pending U.S. patent application Ser. No. 10/388,767 entitled SELECTIVE PROCESSING OF CALLS USING ALTERNATIVE NETWORK TELEPHONY filed concurrently herewith, which is incorporated herein by reference for all purposes.

FIELD OF THE INVENTION

The present invention relates generally to alternative network telephony. More specifically, providing multiple line functionality using alternative network telephony is disclosed.

BACKGROUND OF THE INVENTION

In recent years alternative network telephony, using a network other than the public switched telephone network (PSTN) to enable two or more parties to carry on a conversation in real time, has become increasingly popular. The advent of high-speed access to networks, such as the Internet, has further fueled this trend. Telephone functionality has been provided using personal computers (PC's) or computer workstations connected via the Internet and/or other networks, often through high-speed connections such as cable modems or digital subscriber line (DSL) connections. Telephone functionality has also been provided via cable television networks through television set top boxes, for example.

In many cases, a packet switched network protocol, such as the Internet protocol (IP) is used to provide alternative network telephony (e.g., IP telephony). Under such a protocol, the analog audio signal generated by a speaking call participant is digitized and sent via the alternative network from the sending station to the receiving station(s) in one or more data packets conforming to the applicable protocol. At the receiving end, the data typically is reassembled, if necessary, and converted back to an analog audio signal. The data is then typically delivered to the recipient via an audio output device, such as one or more speakers, a headset, or a telephone handset or other output device.

It would be desirable for cable television service providers, providers of interactive television services and/or equipment, and/or other providers or potential providers of alternative network telephony equipment and services to have a way to compete effectively with more traditional providers of long distance and/or local telephone service. Such competition may bring lower prices, better and expanded service, and more choice to consumers.

One way that alternative network telephony might be used to enhance service is by providing the functionality of multiple telephone extensions without requiring multiple lines connected to the public switched telephone network (PSTN). Complex switches, such as private branch exchange (PBX) switches, have been provided to route calls coming in on a single PSTN line to two or more internal lines. However, such switches typically are expensive to acquire and install, making their use by consumers and small businesses impractical in many cases.

Therefore, there is a need for a way to use alternative network telephony to provide PBX-type functionality, specifically the ability to make and receive calls on multiple internal lines while having only a single PSTN line.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Providing multiple line functionality using alternative network telephony is disclosed. Each of a plurality of telephones is connected to an alternative network telephony call processing system via a dongle interposed between the telephone and the in-building telephone wiring. The dongle incorporates a frequency shifter that shifts the audio signal generated by each telephone by a specific amount associated with the extension to which the telephone corresponds. The call processing system uses the magnitude of the frequency shift to associate audio data received via the in-building telephone wiring with the corresponding extension, enabling the system to process calls on separate telephones, either individually or at the same time.

Figure 1:
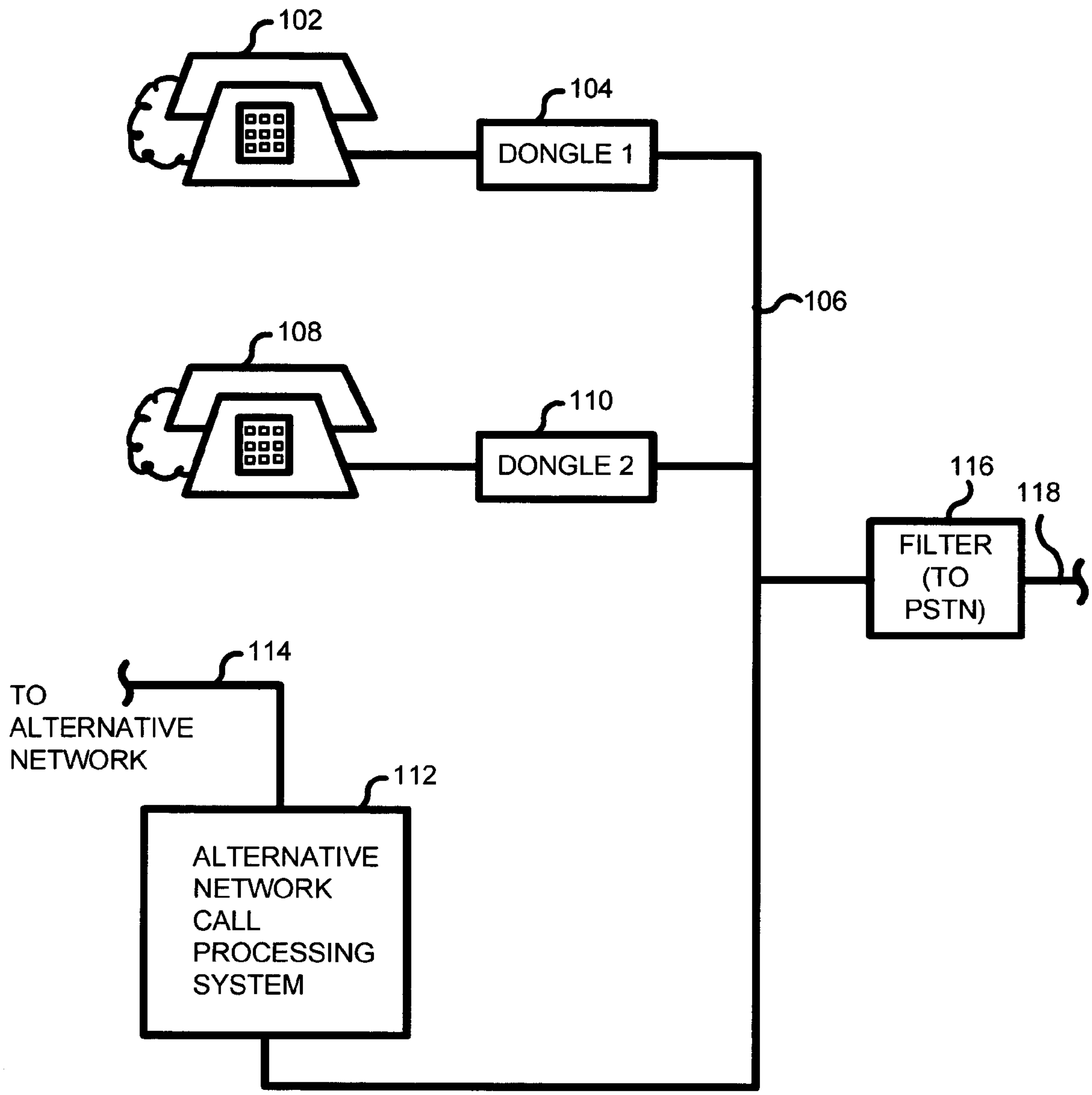
FIG. 1 is a schematic diagram illustrating a system used in one embodiment to use alternative network telephony to provide multiple extension functionality via a single telephone line connection to the PSTN.

FIG. 1 is a schematic diagram illustrating a system used in one embodiment to use alternative network telephony to provide multiple extension functionality via a single telephone line connection to the PSTN. The system comprises a first telephone handset 102 connected via a first dongle 104 to internal telephone wiring 106. The system further comprises a second telephone handset 108 connected via a second dongle 110 to the internal telephone wiring 106. An alternative network call processing system 112 also is connected to the internal telephone wiring 106. The alternative network call processing system 112 is in addition connected to an alternative network, such as the Internet, via an alternative network connection 114. In one embodiment, the alternative network call processing system 112 comprises a personal computer and the connection 114 to the alternative network comprises a cable or other modem connection. In one embodiment, the alternative network call processing system 112 comprises a television set top box connected via the network connection 114 to the alternative network via a cable modem or other modem. In one embodiment, the first dongle 104 is configured to apply a first frequency shift to communications to and from the first telephone handset 102. More particularly, the dongle 104 is configured in one embodiment to shift audio signals received from the telephone handset 102 by a first prescribed amount prior to outputting the audio signal to the internal telephone wiring 106. In one embodiment, the first dongle 104 is further configured to downshift frequency-shifted audio signals received at the dongle 104 via the internal telephone wiring 106 prior to providing such audio signals to the telephone handset 102.

In one embodiment, the second dongle 110 is configured to apply a second frequency shift to audio signals received from and sent to the second telephone handset 108. That is, for audio signals received at the second dongle 110 from the second telephone handset 108, the audio signal is shifted by a second frequency shift prior to being provided as output from the second dongle 110 to the internal telephone wiring 106. In one embodiment, the second dongle 110 is further configured to downshift frequency-shifted audio signals received at the second dongle from the internal telephone wiring 106 by the second frequency shift prior to providing the downshifted incoming audio signal to the second telephone handset 108. In one embodiment, the first frequency shift applied by the first dongle 104 is different in magnitude from the second frequency shift applied by the second dongle 110 in order to enable components of the system to differentiate between frequency-shifted signals associated with the first telephone handset 102 and those associated with the second telephone handset 108, as described more fully below. For example, in one embodiment the first frequency shift may be 100 MHz and the second frequency shift may be 200 MHz. In such an embodiment, the first dongle 104 would shift audio signals generated by the handset 102 up by 100 MHz prior to placing the frequency shifted signal on the internal telephone wiring 106, and the first dongle would downshift frequency shifted audio signals received via the internal telephone wiring 106 by 100 MHz prior to delivering such signals to the handset 102. Likewise, the second dongle 110 would apply a 200 MHz frequency shift to audio signals provided to and from the second telephone handset 108.

Note that while two handsets are shown in the embodiment illustrated in FIG. 1, any number of lines may be added, so long as each handset and/or group of handsets associated with a particular extension are provided with a dongle or other device configured to apply a frequency shift associated with the extension to audio signals provided to or from the handset or group of handsets. Also, while a handset is shown in FIG. 1, any device capable of being connected to a telephone line may be substituted for one or more of the handsets, as will be readily apparent to those of skill in the art. For example, other types of equipment used for voice communication, a fax machine, or other equipment such as modems or other devices that use telephone lines to exchange, receive, and/or deliver data of any type via telephone lines.

The system shown in FIG. 1 further comprises a filter 116 configured to prevent frequency-shifted audio signals on the internal telephone wiring 106 from being passed to the PSTN via external PSTN connection 118. In this manner, frequency-shifted signals passed via the internal telephone wiring 106, such as signals passed between the first telephone handset 102 and the alternative network call processing system 112 or signals passed between the second telephone handset 108 and the alternative network call processing system 112, are not received by the PSTN, and as a result the PSTN neither detects nor interferes with the use of the internal telephone wiring 106 to transmit such frequency-shifted signals between the system components.

In one embodiment, the alternative network call processing system 112 is configured to receive frequency-shifted signals placed on the internal telephone wiring 106 either by first telephone handset 102 via dongle 104 or by the second telephone handset 108 via dongle 110. In one embodiment, the alternative network call processing system 112 is configured to determine which telephone handset a frequency-shifted audio signal received via the internal telephone wiring 106 is associated with based on the amount of the frequency shift applied to the received signal. That is, the alternative network call processing system 112 determines that a received frequency-shifted audio signal originated from the first telephone handset 102 if the amount of frequency shift applied to the signal as determined at the call processing system 112 is the same as the amount that is applied by the first dongle 104.

In one embodiment, the call processing system 112 is configured to connect and process telephone calls placed at either the first telephone handset 102 or the second telephone handset 108, or both, via the alternative network in the manner well known in the art of alternative network telephony. During the processing of such a call, upon the receipt of audio data via the alternative network, the call processing system 112 is configured in one embodiment to determine which telephone extension the call data is associated with and to output such data as a frequency-shifted audio signal that has been shifted in frequency by the call processing system 112 by the amount associated with the telephone handset to which the audio signal is to be delivered, as described more fully below in connection with FIGS. 4–6.

Figure 2:
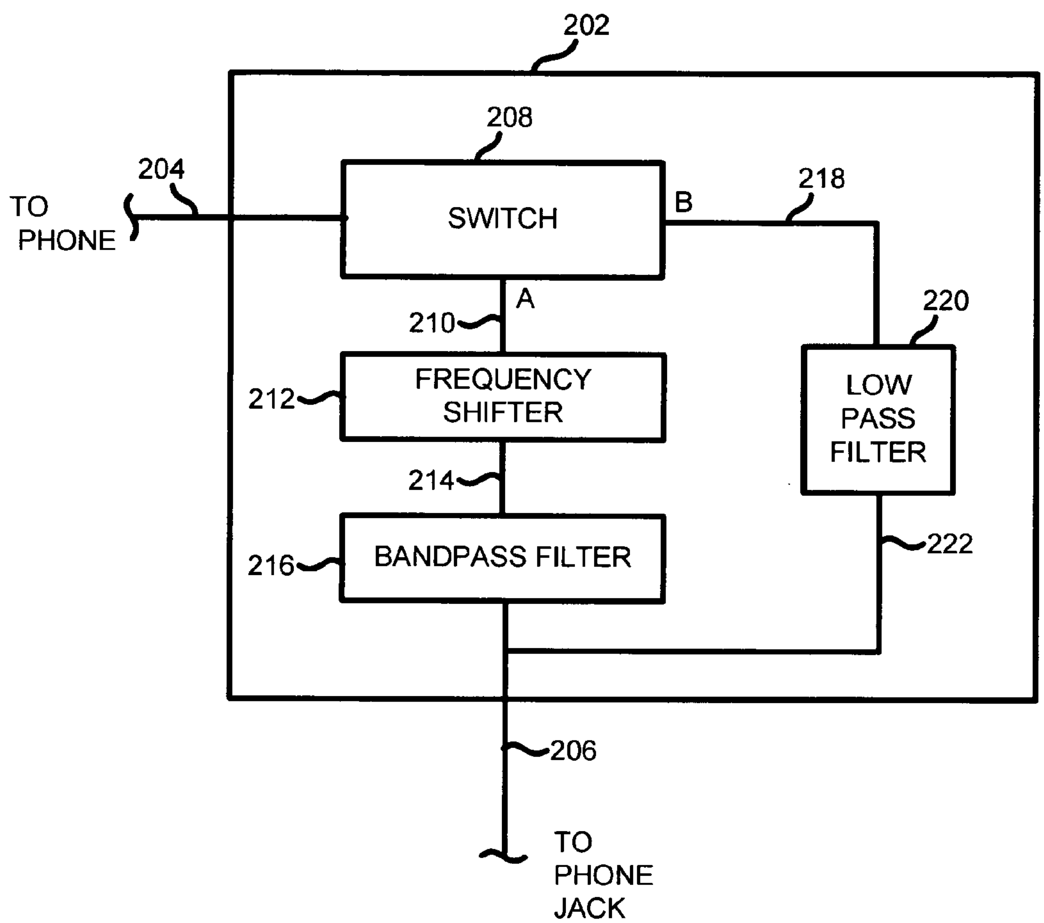
FIG. 2 is a schematic diagram of a dongle used in one embodiment to provide multiple extension functionality using alternative network telephony, such as the first dongle 104 and the second dongle 110 of FIG. 1.

FIG. 2 is a schematic diagram of a dongle used in one embodiment to provide multiple extension functionality using alternative network telephony, such as the first dongle 104 and the second dongle 110 of FIG. 1. The dongle 202 comprises a phone line 204 connected to a telephone handset or other telephone equipment. The dongle 202 further comprises a telephone wiring connection 206 used to connect the dongle to the internal telephone wiring, such as the internal telephone wiring 106 of FIG. 1. The phone line 204 connected to the telephone handset enters the dongle and is connected to a switch 208. In one embodiment, as shown in FIG. 2, the switch 208 has two positions. In a first position, marked "A" in FIG. 2, the phone line 204 is connected through a connector line 210 to a frequency shifter 212. The frequency shifter 212 is connected via a line 214 to a band pass filter 216. In one embodiment, the band pass filter 216 is bi-directional and allows to pass in either direction only signals that fall within a prescribed range of frequencies. In one embodiment, the band pass filter range of frequencies is more or less centered on the frequency corresponding to the magnitude of the frequency shift applied by the frequency shifter 212. In one embodiment, the frequency shifter 212 is configured to shift an outgoing audio signal generated by the telephone handset connected to the phone line 204 by a prescribed amount. In one embodiment, the prescribed frequency shift may be on the order of 100–300 Megahertz. In one embodiment, the frequency shifter is further configured to downshift signals received from the internal telephone wiring via internal telephone wiring connection 206 and bandpass filter 216 by the same amount that outgoing signals are shifted up in frequency.

The second position of the switch 208, marked "B" in FIG. 2, may be used to connect the telephone handset connected to phone line 204 via a line 218 to a low pass filter 220 which connects via a line 222 to the internal telephone wiring via the connection 206. In one embodiment, the line 222, low pass filter 220, and line 218, and the path through said components and the switch 208 to the phone line 204 when the switch 208 is in the second position (i.e. the "B" position) may be used to allow the telephone handset to be connected to the phone line 204 to place and receive calls via the PSTN without applying any frequency shift to either incoming or outgoing audio signals. In one embodiment, it may be desirable to have such a path available as a default or failsafe path in the event of a failure of the alternative network call processing system 112, as described more fully in co-pending application Ser. No. 10/389,277, which is incorporated herein by reference above.

Figure 3:
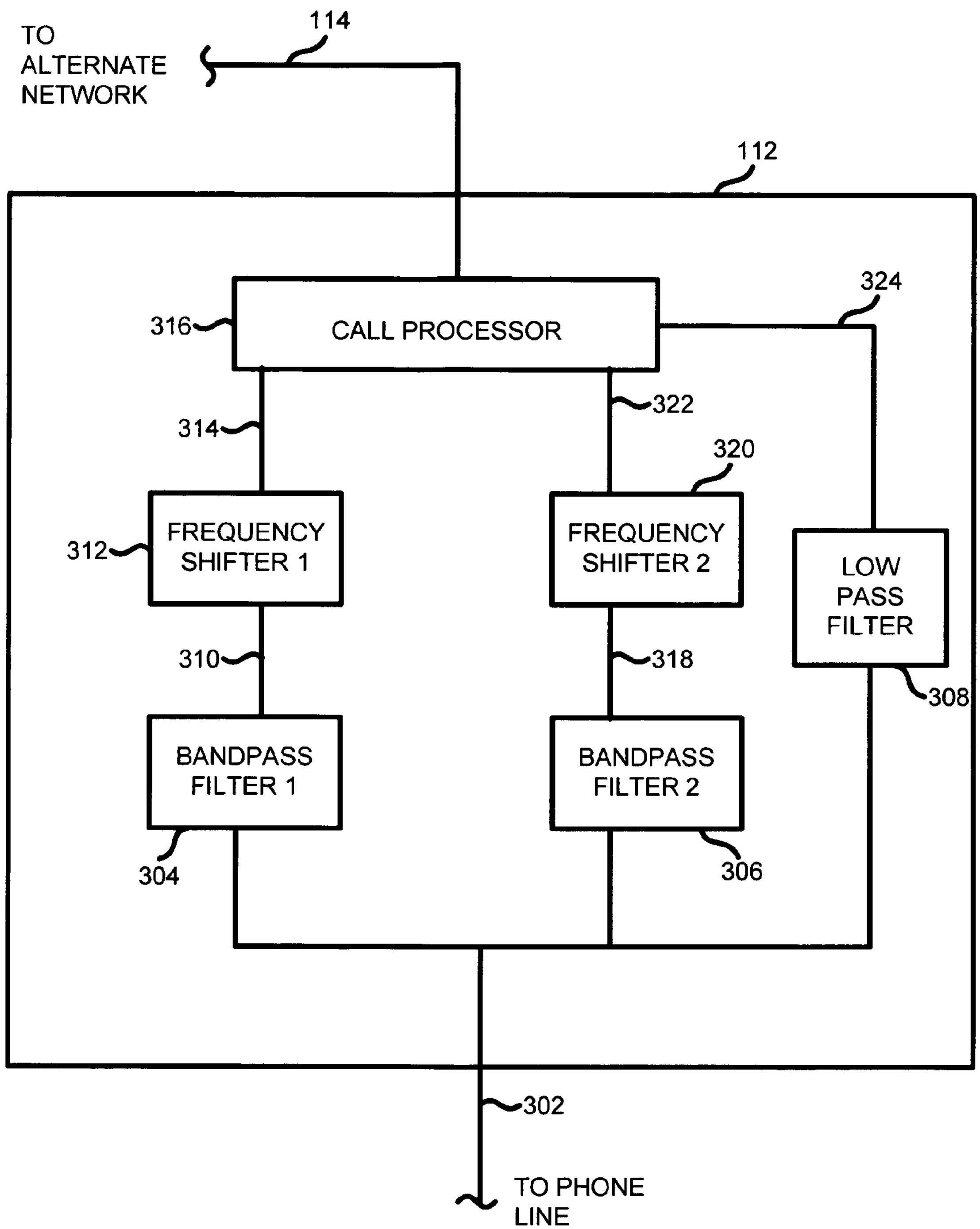
FIG. 3 is a schematic diagram of a call processing system for using alternative network telephony to provide multiple extension functionality, such as the call processing system 112 of FIG. 1.

FIG. 3 is a schematic diagram of a call processing system for using alternative network telephony to provide multiple extension functionality, such as the call processing system 112 of FIG. 1. The call processing system 112 is shown in FIG. 3 as comprising a connection 302 to the internal telephone wiring 106. Within the call processing system 112, the line 302 connected to the internal telephone wiring is connected to a first band pass filter 304, a second band pass filter 306, and a low pass filter 308. In one embodiment, the first band pass filter 304 is configured to allow to pass only frequency-shifted audio signals received via the internal telephone wiring 106 to which the first frequency shift applied by the first dongle 104 has been applied. Likewise, the second band pass filter 306 is configured to allow to pass only those frequency-shifted signals received via the internal telephone wiring 106 to which the second frequency shift applied by the second dongle 110 has been applied. The first band pass filter 304 is connected via connection 310 to a first frequency shifter 312. The first frequency shifter 312 is connected via connection 314 to a call processor 316. In one embodiment the first frequency shifter 312 is configured to downshift frequency-shifted audio signals received via line 310 by the first frequency shift applied by dongle 104, and to provide the downshifted audio signal via connection 314 to the call processor 316. In one embodiment, the call processor 316 associates the received audio signal with the first extension (i.e., the extension associated with the first telephone handset 102) by virtue of the fact that the audio signal is received by the call processor 316 via the connection 314. For a received audio signal to be delivered to the first telephone handset 102, the call processor 316 is configured in one embodiment to output the received audio signal via the line 314 to the first frequency shifter 312. In one embodiment, the first frequency shifter 312 is configured to frequency shift an audio signal received on line 314 by the amount of the first frequency shift associated with the dongle 104 and the first telephone handset 102, and to provide the frequency-shifted audio signal via the line 310 and the first band pass filter 304 to the internal telephone wiring 106 via the connection 302. The frequency-shifted signal is then received by the dongle 104, downshifted, and provided to the first telephone handset 102 as described above. Such a frequency-shifted signal intended for the first telephone handset 102 would not be passed by the dongle 110 to the second telephone extension 108 in one embodiment by operation of the band pass filter within said dongle, such as band pass filter of 216 of FIG. 2.

Similar to the corresponding path for signals associated with the first telephone handset, the second band pass filter 306 is configured in one embodiment to pass only signals shifted by the second frequency shift, i.e., the frequency shift associated with the second dongle 110 and the second telephone handset 108 of FIG. 1. The second band pass filter 306 is connected via a connection 318 to a second frequency shifter 320. The second frequency shifter 320 is connected via connection 322 to the call processor 316. In one embodiment, the second frequency shifter 320 is configured to downshift frequency-shifted signals received by the call processing system 112 via the internal telephone wiring 106 by the amount of the second frequency shift and to provide the downshifted signal via the connection 322 to the call processor 316. In one embodiment, the call processor 316 recognizes a signal received via the connection 322 from the second frequency shifter 320 as being a signal associated with the second telephone handset 108. Incoming and outgoing signals associated with the second telephone handset would be processed by the call processor 316 in the same manner as described above for signals associated with the first telephone handset 102, with the exception that the connections 322, the frequency shifter 320, the connection 318, and the second band pass filter 306 would be used.

The low pass filter 308 of FIG. 3 is connected via the connection 324 to the call processor 316. In one embodiment, the connection between the call processor 316 via the low pass filter 308 to the internal telephone wiring 106 via connection 302 is provided to enable the call processing system 112 to receive and place calls on behalf of a user of either the first telephone handset 102 or the second telephone handset 108 via the PSTN, using the process described above to pass audio signals to and from the applicable telephone handset in the form of frequency-shifted audio signals. Such proxying of calls via the PSTN is described more fully in co-pending application Ser. No. 10/388,767, which is incorporated herein by reference above.

Figure 4:
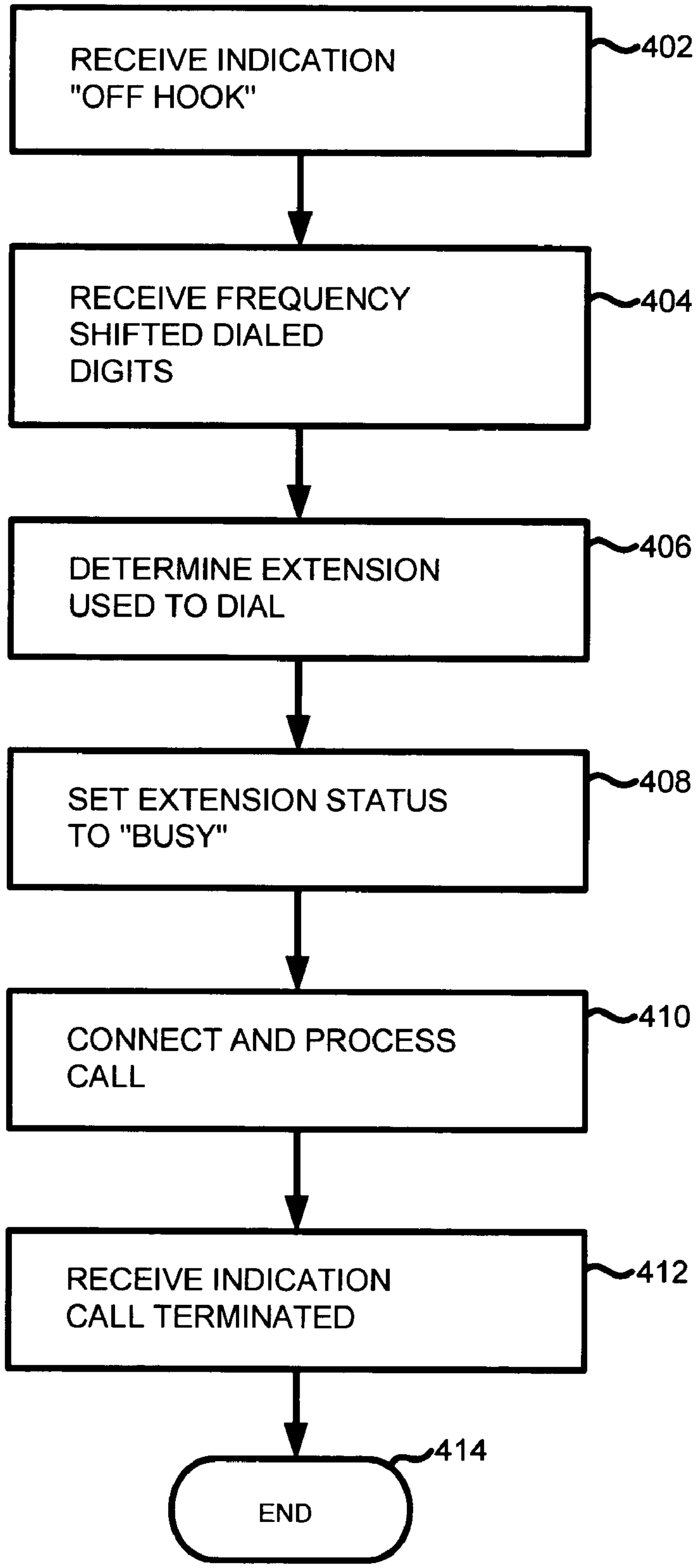
FIG. 4 is a flowchart illustrating a process implemented in one embodiment on a call processing system, such as the call processing system 112 of FIG. 1, to enable a user to place an outgoing telephone call either from the first telephone handset 102 or from the second telephone handset 108 via the call processing system 112 in a system configured to use alternative network telephony to provide multiple extension functionality.

FIG. 4 is a flowchart illustrating a process implemented in one embodiment on a call processing system, such as the call processing system 112 of FIG. 1, to enable a user to place an outgoing telephone call either from the first telephone handset 102 or from the second telephone handset 108 via the call processing system 112 in a system configured to use alternative network telephony to provide multiple extension functionality. The process begins at step 402 in which the call processing system receives an indication that a telephone handset has been taken off the hook by a user. In step 404, the call processing system receives frequency shifted dialed digits. In step 406, the call processing system determines the extension used to dial the dialed digits. In one embodiment, as described above, the call processing system is configured to determine which extension was used to dial the frequency-shifted dialed digits by determining the amount of the frequency shift applied by the corresponding dongle to the dialed digits prior to their being placed as a frequency shifted signal on the internal telephone wiring 106. In one embodiment, as described above in connection with FIG. 3, the call processor within the call processing system makes this determination based on which band pass filter and associated frequency shifter are used to process the signal and provide it to the call processor. Those of ordinary skill in the art will recognize that many other combinations of components may be used to enable the call processing system to associate the received digits with a particular extension.

In step 408 of the process shown in FIG. 4, the call processing system sets a flag or status register associated with the extension that was used to dial the dialed number to indicate the status of the associated telephone handset as "busy". In step 410, the call processing system connects and processes the call in the manner well known in the art of alternative network telephony. The process of connecting and processing a call is illustrated more fully in FIG. 6, discussed below. In step 412, the call processing system receives an indication that the call has been terminated by one or the other of the participants, in which case the process shown in FIG. 4 ends in step 414.

Figure 5:
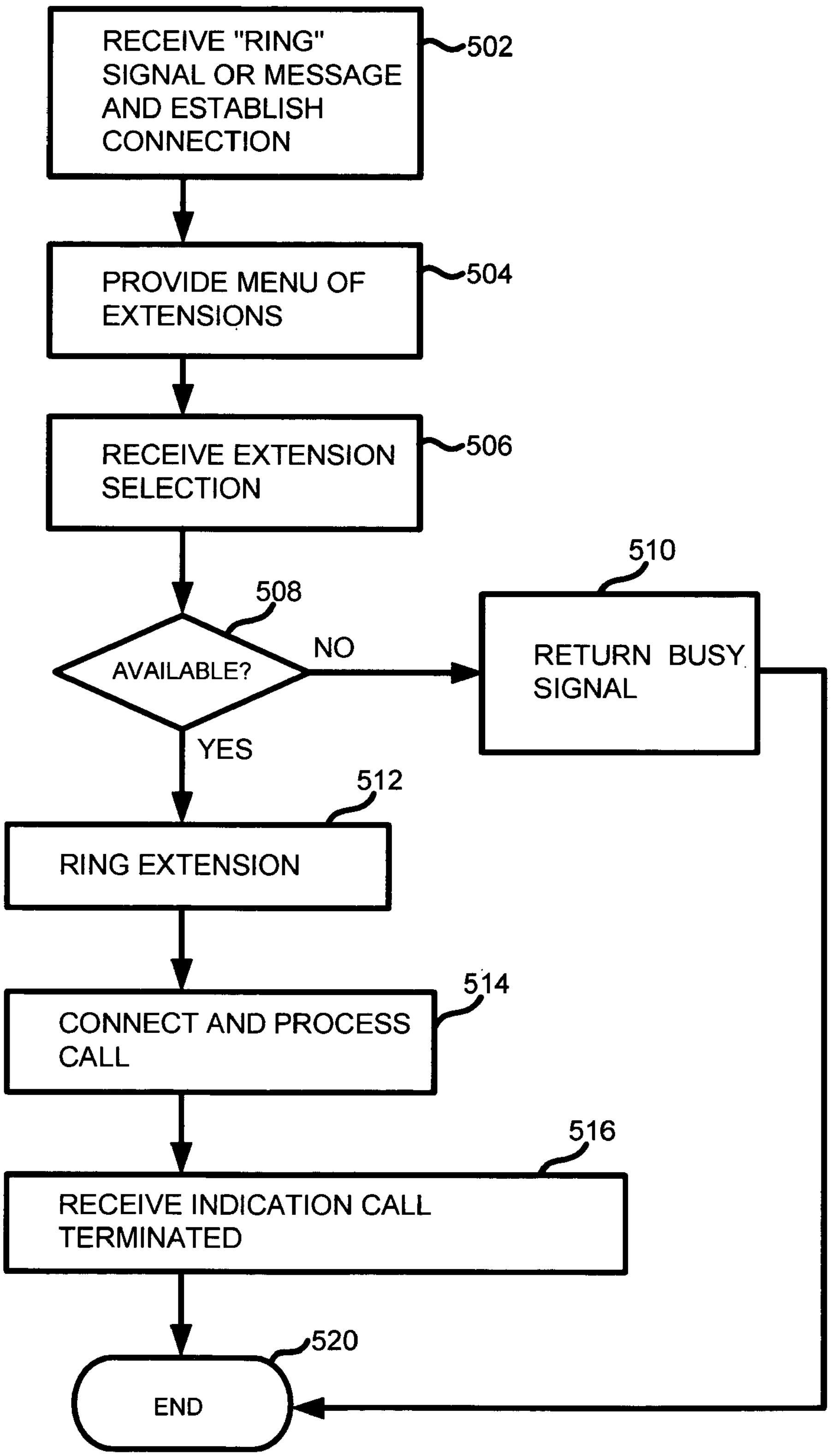
FIG. 5 is a flowchart illustrating a process implemented in one embodiment on a call processing system to receive telephone calls on a system configured to provide multiple extension functionality using alternative network telephony.

FIG. 5 is a flowchart illustrating a process implemented in one embodiment on a call processing system to receive telephone calls on a system configured to provide multiple extension functionality using alternative network telephony. The process begins in step 502 in which the call processing system receives a "ring" signal or message and establishes a connection with the calling party. In one embodiment, the "ring" signal or message is received via the alternative network. In one alternative embodiment, the "ring" signal or message may be received via the alternative network if the call is being received via alternative network telephony or the "ring" signal may be received via the PSTN if the call has been placed via the PSTN. In step 504, the call processing system provides to the calling party an audio message prompting the calling party to make a selection of the extension to which the calling party would like to be connected. In step 506, the call processing system receives from the calling party an indication of the extension to which the calling party would like to be connected. In step 508, the call processing system determines whether or not the selected extension is available. If it is determined in step 508 that the selected extension is not available, the call processing system in step 510 returns to the calling party a "busy" signal or message and the process ends in step 520. If it is determined in step 508 that the selected extension is available, the process proceeds to step 512 in which the call processing system causes the selected extension to ring. In one embodiment, the call processing system is configured to ring the selected extension by sending to the selected extension a prescribed frequency-shifted ring signal. In one embodiment, the dongle associated with the selected telephone handset is configured to recognize the frequency-shifted ring signal and to cause the associated telephone handset to ring. In step 514 of the process shown in FIG. 5, the call processing system receives an indication that the telephone handset associated with the selected extension has been taken off the hook, and the call is connected and processed by the call processing system, as described more fully below in connection with FIG. 6. In step 516, the call processing system receives an indication that the call has been terminated by one or the other of the call participants, in which case the process ends in step 520.

Figure 6:
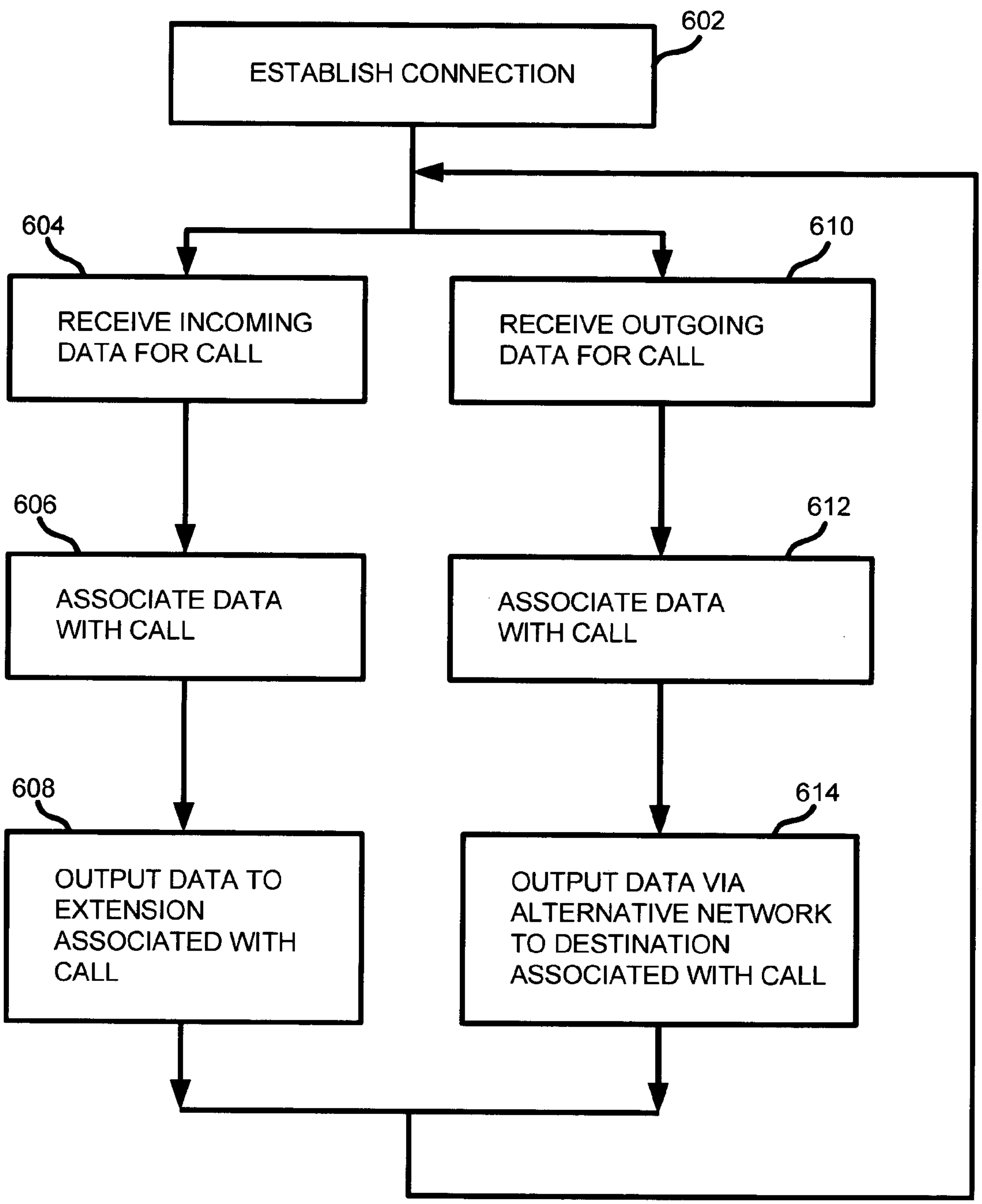
FIG. 6 is a flowchart illustrating a process implemented in one embodiment on the call processing system, such as call processing system 112 of FIG. 1, to connect and process calls as in step 410 of FIG. 4 and step 514 of FIG. 5.

FIG. 6 is a flowchart illustrating a process implemented in one embodiment on the call processing system, such as call processing system 112 of FIG. 1, to connect and process calls as in step 410 of FIG. 4 and step 514 of FIG. 5. The process begins with step 602 in which a connection is established. In one embodiment, the establishment of a connection in step 602 comprises making a table entry associating the calling party with the called party and/or extension. In one embodiment, establishing a connection in step 602 comprises creating a software object associated with the call, in which the software object associates the calling party and the called party and/or extension. In one embodiment, the step 602 comprises establishing an open and active end to end data path between the called party and the calling party, using alternative network telephony, if applicable, in the manner well known in the art of alternative network telephony and telephone communications generally.

Steps 604, 606, and 608 of FIG. 6 describe the processing steps performed by the call processing system for audio data received from a remote party for delivery to either the first handset 102 or the second handset 108 of the system shown in FIG. 1. In step 604, incoming audio data associated with a call is received via the alternative network. In one alternative embodiment, the incoming call data may be received either via the alternative network or via the PSTN. In step 606, the received audio data is associated with the call to which it corresponds. In one embodiment, the call processing system associates the received audio data with the corresponding call based on the source from which the incoming audio data is received. In step 608, the received audio data is output to the extension associated with the call. In one embodiment, digital audio data received via the alternative network is converted to an analog audio signal and then frequency shifted by the amount corresponding to the extension to which the received audio data is to be delivered prior to placing the frequency shifted audio signal on to the internal telephone wiring 106 for delivery via the appropriate dongle to the extension to which the audio signal is to be delivered. As described above, an audio signal shifted in frequency in the prescribed amount for the destination handset will be passed to the handset only by the dongle associated with the handset that corresponds to that particular frequency shift, and will not be delivered by any other dongles to their associated handsets. Likewise, the filter between the internal telephone wiring 106 and the PSTN, such as filter 116 of FIG. 1, will not allow the frequency-shifted audio signal to pass to the PSTN.

Steps 610, 612, and 614 describe the processing steps for outgoing audio data, i.e., audio signals received from the telephone handset associated with the call and intended for delivery to the remote call participant associated with the call. In step 610, an outgoing audio signal is received via the internal telephone wiring 106 at the call processing system 112. As described above, the outgoing audio signal would be received in the form of a frequency shifted analog audio signal. In step 612, the received audio signal is associated with the call to which it pertains. In one embodiment, as described above, the received outgoing audio signal is associated with the call to which it pertains by determining the amount of frequency shift that was applied to the audio signal by the corresponding dongle prior to its being placed on the internal telephone wiring 106, and identifying the extension to which that frequency shift corresponds. In step 614, the outgoing audio data is sent to the remote destination associated with the call, i.e., the other call participant, either via the alternative network or via the PSTN, as applicable.

The steps 604, 606, and 608 for incoming audio data, and the steps 610, 612, and 614 for outgoing audio data, are repeated as necessary to send and receive audio data between the call participants as the respective call participants speak, until an indication is received that the call has been terminated, as in step 412 of FIG. 4 and step 416 of FIG. 5.

As will be apparent to those of skill in the art, it is possible using the frequency shifting techniques described herein to process more than one call at a time without requiring multiple lines connected to the PSTN. For example, a first call may be taking place on a first virtual extension while a second call is taking place on a second virtual extension. The respective data associated with the respective calls will not be confused by the call processing system, which will distinguish between the two, as described above, based on the frequency shift applied to frequency shifted signals received by the system via the internal telephone wiring and in the case of data received from remote participants based on other data or information used by the call processing system to associate received data with the call to which it corresponds, such as based on the source from which it is received, etc.

While certain of the examples described in detail above relate to a telephone call in which participants speak to each other, other types of calls and connections may be made, such as exchanging data other than voice data.

While one or more embodiments described in detail herein may employ frequency shifting, the present disclosure contemplates and encompasses approaches in which other encoding techniques are used. The only requirement is that the alternative network call processing system must be able to distinguish between signals on the internal telephone wiring that are in the normal voice range, which are meant to be processed normally over the PSTN, and specially encoded signals which are meant to be processed not by the PSTN but instead by the alternative network call processing system; and, as among calls intended to be processed by alternative network telephony, the encoding must be such that the system can distinguish between call data associated with different virtual extensions. For example, and without limitation, any suitable type of frequency encoding may be used. In one embodiment, instead of using frequency shifting as described above an incoming or outgoing audio signal may be used to frequency modulate one or more carrier waves having a frequency outside the normal frequency range of a voice signal. In one such embodiment, frequency filters may be used to permit applicable components to either operate on, or ignore, a signal depending on the carrier frequency used, in a manner similar to the frequency shifting approach described above. In one embodiment, in the system of FIG. 1 the dongles 104 and 110 are configured to encode and decode voice signals originated by and destined for the handset 102 and 108, respectively, in accordance with the encoding method the remaining system components, such as alternative network call processing system 112, are configured to use. For example, in one embodiment where frequency modulation encoding is used, the dongles 104 is configured to use a voice range audio signal generated by handset 102 to modulate a first carrier frequency sufficiently outside the normal voice range to enable the relevant remaining components to distinguish such an encoded signal from an unencoded a voice range audio signal, and the dongle 110 is configured to use a voice range audio signal generated by handset 108 to modulate a second carrier frequency sufficiently outside the normal voice range to enable the relevant remaining components to distinguish such an encoded signal from an unencoded a voice range audio signal and sufficient different from the first carrier frequency to enable the system to distinguish between encoded signals associated with handset 102 and those associated with handset 108. In one embodiment, the dongles 104 and 110 are configured to receive a signal encoded using frequency modulation of a carrier signal having a frequency outside the normal voice range, demodulate the signal, and present the decoded original signal as audio output on handsets 102 and 108, respectively, each being configured to decode only those encoded signals associated with its corresponding handset, such as by using a filter to block signals in a range near the frequency of the carrier signal associated with other handsets.

While processing of calls comprising voice audio signals is described above, the approach described herein may as well be used to handle other types of audio signals. In such other cases, the frequency shift, carrier frequency, or other encoding parameter, as appropriate, is selected so as to ensure that the relevant system components can distinguish between and encoded signal and one that has not been encoded. As used herein, the term "encoding" means transforming the signal into a form so that system components may be configured to distinguish between the encoded signal and a signal that has not been encoded, such as by, without limitation, adjusting, modifying, or transforming the signal, combining the signal with another signal, using the signal to modulate another signal or carrier wave, etc.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for providing multiple line functionality using alternative network telephony for a local telephone installation comprising a first local telephone equipment associated with a first local node, a second telephone equipment associated with a second local node, and local telephone wiring connected to said first and second local nodes, the local telephone installation being associated for purposes of the public switched telephone network (PSTN) with a single telephone line, the method comprising:

receiving at a third local node from a calling party a request to establish a connection with the local telephone installation;

determining whether the calling party desires to establish a connection to (1) a first telephone extension associated with the first local node or (2) a second telephone extension associated with the second local node;

establishing a connection from the third local node to the desired extension over the local telephone wiring in a manner that does not affect the other extension;

receiving outgoing audio data at the local node associated with the desired extension;

shifting the outgoing audio data up in frequency by a frequency shift associated with the desired extension at the local node associated with the desired extension;

providing the frequency shifted outgoing audio data to the local telephone wiring;

receiving the frequency shifted outgoing audio data at the third local node;

downshifting the frequency shifted outgoing audio data in frequency by the frequency shift associated with the desired extension; and sending the downshifted outgoing audio data to the calling party via the alternative network using alternative network telephony.

2. The method of claim 1, wherein the step of determining comprises obtaining from the calling party a selection of an extension.

3. The method of claim 2, wherein the step of obtaining comprises querying the calling party to ask the calling party to select an extension.

4. The method of claim 1, wherein the step of establishing a connection from the third local node to the desired extension over the local telephone wiring in a manner that does not affect the other extension comprises:

providing to the local telephone wiring at the third node a modified ring signal that the local telephone equipment associated with the desired extension is configured to recognize as a ring signal but that the local telephone equipment associated with the other extension is configured to ignore; and receiving at the third node via the local telephone wiring a modified off hook signal generated by the local telephone equipment associated with the desired extension;

wherein the local telephone equipment associated with the other extension is configured to ignore the modified off hook signal generated by the local telephone equipment associated with the desired extension.

5. The method of claim 4, wherein the ring signal is modified by shifting it in frequency by a prescribed frequency shift associated with the desired extension.

6. The method of claim 5, wherein the ring signal is frequency shifted into a frequency range that the local telephone equipment associated with the other extension is configured to ignore.

7. The method of claim 6, wherein the local node associated with the other extension is provided with a filter configured to block signals in the frequency range into which the ring signal has been shifted.

8. The method of claim 5, wherein the local node associated with the desired extension is configured to:

downshift the frequency shifted ring signal received at the local node associated with the desired extension by the frequency shift associated with the desired extension; and provide the downshifted ring signal to the local telephone equipment associated with the desired extension.

9. The method of claim 1, wherein the local node associated with the other extension is configured to ignore the frequency shifted outgoing audio data.

10. The method of claim 1, wherein the local node associated with the other extension comprises a filter and the frequency shifted outgoing audio data is shifted into a frequency range that the filter is configured to block.

11. The method of claim 1, further comprising:

receiving at the third node, via alternative network telephony, incoming audio data from the calling party;

frequency shifting the incoming audio data in frequency by a second frequency shift;

providing the frequency shifted incoming audio data to the local telephone wiring;

receiving the frequency shifted incoming audio data at the local node associated with the desired extension;

downshifting the frequency shifted incoming audio data by the second frequency shift; and providing the downshifted incoming audio data to the local telephone equipment associated with the local node associated with the desired extension.

12. The method of claim 11, wherein the prescribed frequency shift associated with the desired extension and the second frequency shift are the same.

13. The method of claim 1, wherein the calling party comprises a first calling party and the call between the first calling party and the desired extension comprises a first call, and further comprising:

receiving at the third local node from a second calling party a request to establish a connection with the local telephone installation;

determining whether the second calling party desires to establish a connection to (1) the desired extension participating in the first call or (2) the other extension; and in the event it is determined that the second calling party desires to establish a connection to the other extension, establishing a connection from the third local node to the other extension over the local telephone wiring in a manner that does not affect the desired extension;

whereby a second call may be conducted between the second calling party and the other extension at the same time as the first call is being conducted between the first calling party and the desired extension.

14. The method of claim 13, further comprising returning to the second calling party a busy signal, in the event it is determined that the second calling party desires to establish a connection to the desired extension, at a time when said desired extension is already participating in the first call.

15. The method of claim 13, further comprising:

receiving a second outgoing audio data at the local node associated with the other extension;

shifting the second outgoing audio data up in frequency by a frequency shift associated with the other extension at the local node associated with the other extension;

providing the second frequency shifted outgoing audio data to the local telephone wiring;

receiving the second frequency shifted outgoing audio data at the third local node;

associating the second received frequency shifted outgoing audio data with the other extension;

downshifting the second frequency shifted outgoing audio data in frequency by the frequency shift associated with the other extension; and sending the second downshifted outgoing audio data to the second calling party;

wherein the frequency shift associated with the other extension is different than the frequency shift associated with the desired extension, such that frequency shifted audio data received at the third node may be associated with the local node associated with the extension from which the frequency shifted audio data was received.

16. The method of claim 15, further comprising determining whether frequency shifted audio data received at the third local node is associated with the other extension or the desired extension based at least in part on the amount of frequency shift that was applied to the outgoing audio data at the node from which it was received.

17. The method of claim 13, wherein the local telephone installation comprises a plurality of local telephone equipment, each associated with a corresponding local node and a corresponding extension, the method further comprising:

receiving at the third node one or more successive requests to establish a connection with the local telephone installation;

determining whether the calling party desires to establish a connection to (1) an extension presently participating in a call or (2) an available one of the plurality of extensions; and in the event it is determined that the calling party desires to establish a connection to an available one of the plurality of extensions, establishing a connection from the third local node to the available one of the plurality of extensions over the local telephone wiring in a manner that does not affect the other extensions;

whereby as many calls as there are extensions may be conducted at the same time without call data associated with one call interfering with call data associated with any other call, and without telephone equipment not associated with a particular call being affected by call data associated with that particular call.

18. A system for providing multiple line functionality using alternative network telephony for a local telephone installation comprising a first local telephone equipment associated with a first local node, a second telephone equipment associated with a second local node, and local telephone wiring connected to said first and second local nodes, the local telephone installation being associated for purposes of the public switched telephone network (PSTN) with a single telephone number, comprising:

an alternative network call processing system located at a third local node associated with the local telephone installation, the alternative network call processing system comprising:

a first connection to the local telephone wiring;

a second connection to an alternative network; and a processor configured to:

receive from a calling party a request to establish a connection with the local telephone installation;

determine whether the calling party desires to establish a connection to (1) a first telephone extension associated with the first local node or (2) a second telephone extension associated with the second local node;

establish a connection from the third local node to the desired extension over the local telephone wiring in a manner that does not affect the other extension;

wherein the connector associated with the local node associated with the desired extension is configured to:

receive outgoing audio data at the local node associated with the desired extension;

shift the outgoing audio data up in frequency by a frequency shift associated with the desired extension at the local node associated with the desired extension; and provide the frequency shifted outgoing audio data to the local telephone wiring; and wherein the alternative network call processing system is further configured to:

receive the frequency shifted outgoing audio data at the third local node;

downshift the frequency shifted outgoing audio data in frequency by the frequency shift associated with the desired extension; and send the downshifted outgoing audio data to the calling party via the alternative network using alternative network telephony.

19. The system of claim 18, wherein the processor is configured to determine whether the calling party desires to establish a connection to (1) a first telephone extension associated with the first local node or (2) a second telephone extension associated with the second local node by obtaining from the calling party a selection of an extension.

20. The system of claim 19, wherein the processor is configured to obtain from the calling party a selection of an extension by querying the calling party to ask the calling party to select an extension.

21. The system of claim 18, wherein the processor is configured to establish a connection from the third local node to the desired extension over the local telephone wiring in a manner that does not affect the other extension by:

providing to the local telephone wiring at the third node a modified ring signal that the local telephone equipment associated with the desired extension is configured to recognize as a ring signal but that the local telephone equipment associated with the other extension is configured to ignore; and receiving at the third node via the local telephone wiring a modified off hook signal generated by the local telephone equipment associated with the desired extension;

wherein the local telephone equipment associated with the other extension is configured to ignore the modified off hook signal generated by the local telephone equipment associated with the desired extension.

22. The system of claim 18, wherein:

the first telephone equipment comprises a first connector connected to the local telephone wiring at the first local node; and the second telephone equipment comprises a second connector connected to the local telephone wiring at the second local node;

wherein the first and second connectors are configured, respectively, to block data on the local telephone wiring from being passed to the local telephone equipment associated with the connector if the data is not associated with the local telephone equipment associated with the connector, such that the connector associated with the other extension blocks the modified ring signal and the modified off hook signal associated with the desired extension.

23. The system of claim 22, wherein the ring signal is modified by shifting it in frequency by a prescribed frequency shift associated with the desired extension.

24. The system of claim 23, wherein the ring signal is frequency shifted into a frequency range that the local telephone equipment associated with the other extension is configured to ignore.

25. The system of claim 24, wherein the connector associated with the other extension comprises a filter configured to block signals in the frequency range into which the ring signal has been shifted.

26. The system of claim 22, wherein the connector associated with the desired extension is configured to:

downshift the frequency shifted ring signal received at the local node associated with the desired extension by the frequency shift associated with the desired extension; and provide the downshifted ring signal to the local telephone equipment associated with the desired extension.

27. The system of claim 18, wherein the connector associated with the other extension is configured to block the frequency shifted outgoing audio data from passing to the local telephone equipment associated with the other extension.

28. The system of claim 18, wherein the connector associated with the other extension comprises a filter and the frequency shifted outgoing audio data is shifted into a frequency range that the filter is configured to block.

29. The system of claim 18, wherein:

the alternative network call processing system is further configured to:

receive at the third node, via alternative network telephony, incoming audio data from the calling party;

shift the incoming audio data in frequency by a second frequency shift; and provide the frequency shifted incoming audio data to the local telephone wiring; and the connector associated with the local node associated with the desired extension is configured to:

receive the frequency shifted incoming audio data at the local node associated with the desired extension;

downshift the frequency shifted incoming audio data by the second frequency shift; and provide the downshifted incoming audio data to the local telephone equipment associated with the local node associated with the desired extension.

30. The system of claim 29, wherein the prescribed frequency shift associated with the desired extension and the second frequency shift are the same.

31. The system of claim 30, wherein the calling party comprises a first calling party and the call between the first calling party and the desired extension comprises a first call, and wherein the alternative network call processing system is further configured to:

receive at the third local node from a second calling party a request to establish a connection with the local telephone installation;

determine whether the second calling party desires to establish a connection to (1) the desired extension participating in the first call or (2) the other extension; and in the event it is determined that the second calling party desires to establish a connection to the other extension, establish a connection from the third local node to the other extension over the local telephone wiring in a manner that does not affect the desired extension;

whereby a second call may be conducted between the second calling party and the other extension at the same time as the first call is being conducted between the first calling party and the desired extension.

32. The system of claim 31, wherein the alternative network call processing system is further configured to return to the second calling party a busy signal, in the event it is determined that the second calling party desires to establish a connection to the desired extension, at a time when said desired extension is already participating in the first call.

33. The system of claim 31, wherein the alternative network call processing system is configured to:

establish the connection between the first calling party and the third local node, and exchange audio data associated with the first call between the first calling party and the third local node, via the alternative network using alternative network telephony; and establish the connection between the second calling party and the third local node, and exchange audio data associated with the second call between the second calling party and the third local node, via either the PSTN or the alternative network using alternative network telephony;

whereby one or the other, but not both, of the first and second calls may be conducted via the PSTN while the other is conducted via the alternative network using alternative network telephony.

34. The system of claim 31, wherein:

the connector associated with the local node associated with the other extension is configured to:

receive a second outgoing audio data at the local node associated with the other extension;

shift the second outgoing audio data up in frequency by a frequency shift associated with the other extension at the local node associated with the other extension;

provide the second frequency shifted outgoing audio data to the local telephone wiring; and the alternative network call processing system is configured to:

receive the second frequency shifted outgoing audio data at the third local node;

associate the second received frequency shifted outgoing audio data with the other extension;

downshift the second frequency shifted outgoing audio data in frequency by the frequency shift associated with the other extension; and send the second downshifted outgoing audio data to the second calling party;

wherein the frequency shift associated with the other extension is different than the frequency shift associated with the desired extension, such that frequency shifted audio data received at the third node may be associated with the local node associated with the extension from which the frequency shifted audio data was received.

35. The system of claim 34, further comprising determining whether frequency shifted audio data received at the third local node is associated with the other extension or the desired extension based at least in part on the amount of frequency shift that was applied to the outgoing audio data at the node from which it was received.

36. The system of claim 18, wherein the alternative network call processing system comprises a television set top box.

37. The system of claim 18, wherein the alternative network call processing system comprises a personal computer.

38. The system of claim 18, wherein the local telephone equipment comprises a telephone handset.

39. The system of claim 18, wherein the local telephone equipment comprises a facsimile machine.

40. The system of claim 18, wherein the local telephone equipment comprises a computer modem.

* * * * *